Oct. 26, 1943.   W. I. JONES   2,332,855
WIRING CLIP
Filed June 26, 1942
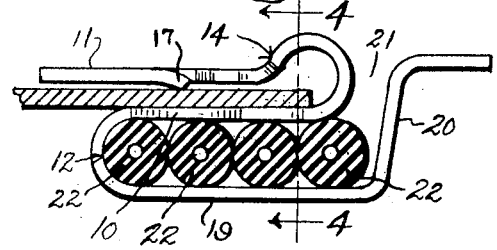
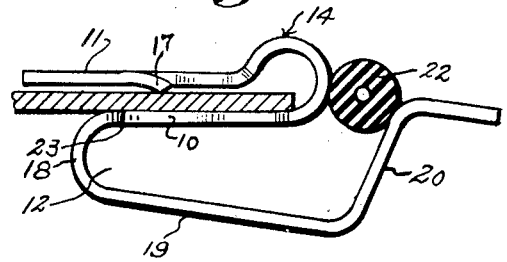
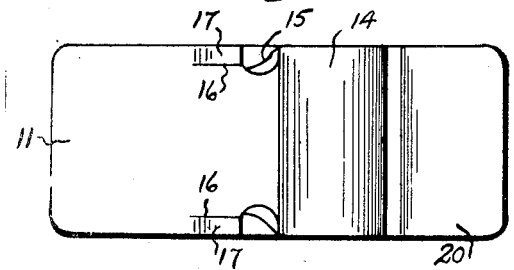
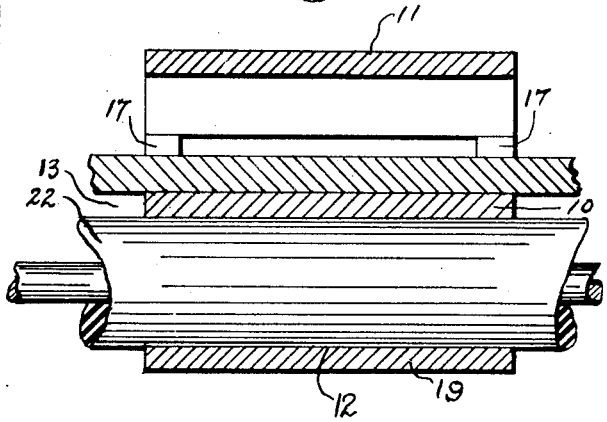
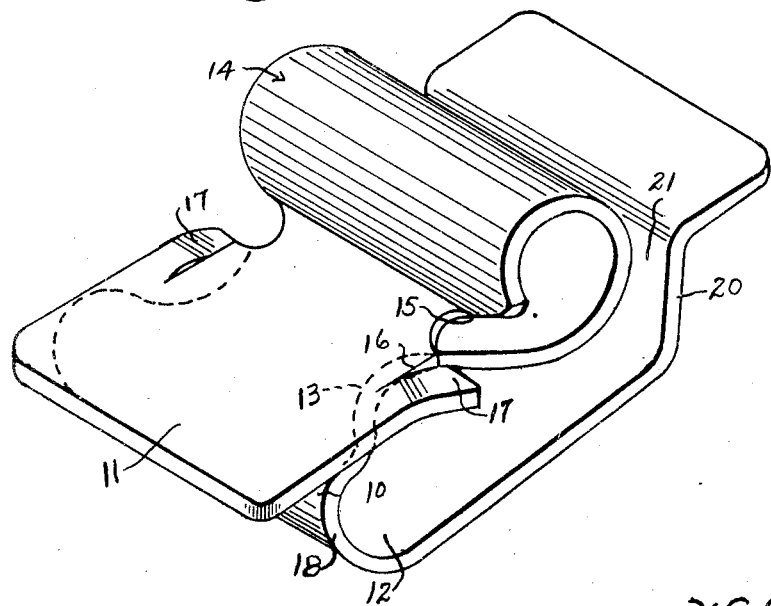
Inventor:
Walter I. Jones Patented Oct. 26, 1943

2,332,855

UNITED STATES PATENT OFFICE 2,332,855

WIRING CLIP

Walter I. Jones, Belmont, Mass., assignor to United-Carr Fastener Corporation, Cambridge, Mass., a corporation of Massachusetts Application June 26, 1942, Serial No. 448,693

3 Claims. (Cl. 24—73)

The present invention relates to wiring clips for gripping and clamping a plurality of strands or electrical conductors together and aims generally to improve existing clips for this purpose.

More particularly, the invention aims to provide an improved clip which may be attached by a sliding and gripping action to a support as, for example, a frame member of airplanes and the like and which will effectively hold a group of wires in proper position resisting dislodgment from the frame member when subjected to vibration, usually present in such installations.

Illustrative of the invention, reference is made to the accompanying drawing, illustrating a preferred embodiment, and in which Fig. 1 is a side elevation of the improved clip illustrated as attached to a supporting part and retaining a plurality of electrical conductors therein;

Fig. 2 is a similar view illustrating the position assumed by the clip as a conductor is inserted therein;

Fig. 3 is a plan view of the clip;

Fig. 4 is a transverse section taken on the line 4—4 of Fig. 1; and

Fig. 5 is a perspective view of the clip.

Referring to the drawing, the improved conductor clip of the invention is preferably made from a single piece of thin stiff metal as, for example, spring steel, comprising a base portion 10, a looped attaching portion 11 extending reversely from one end of the base, and a looped strand-receiving portion 12 extending reversely from the other end and on the opposite side of the base. The clip thus is of a general S-shape with one loop flattened toward the middle to form an attaching portion 11 and the other loop forming a strand-receiving portion 12.

The base 10 may be relatively flat and of substantial length and preferably is formed with recesses 13 in the side edges, as illustrated in Fig. 5. One end of the base is continued in the form of the upwardly curved loop 14 and then reversely in a relatively flat attaching portion or plate disposed substantially parallel to the base 10, said loop providing a spring means connecting the base 10 and attaching plate and normally forcing the attaching portion resiliently toward the base. A portion of the opposite sides of the attaching portion is recessed, as at 15, adjacent the loop 14, and the body thereof is slitted rearwardly along lines spaced inwardly from the side edges thereof, as at 16, to provide spaced clamping tongues or claws 17, the free ends of which are preferably flat and inturned toward the base 10.

It will be observed that these tongues 17 are disposed above the recess 13, so that as the attaching portion is slipped on a supporting member or plate 1, the flat ends of the tongues 17 grip the support 1 at spaced restricted areas and the base 10 engages the opposite face of the support through a broad area intermediate the spaced restricted areas and out of opposed alignment therewith. This provides a very secure grip between the clip and supporting plate 1, and one which will not work loose or excessively cut into the support when subjected to excessive vibration, as occurs in aircraft and like installations. In such installations the supporting members are usually smooth-surface and do not provide an efficient gripping surface.

The opposite end of the base is continued as a loop 18 and a reversely extending flat portion 19 spaced from said base 10 and terminating in an upstanding and outwardly flared finger portion 20 beyond the loop 14, the adjacent oppositely curved portions of the loop 14 and finger portion 20 constituting an entering throat 21 through which the strands or conductors 22 may be forced.

In use the attaching portion 11 of the clip is slipped over a supporting member 1, which may be a thin metal plate, the spring loop portion 14 serving to hold the base 10 tightly against one face of the support, and the tongues 17 tightly against the opposed face of the support, so that the support is gripped in unaligned areas on opposite sides. As will be observed in Fig. 1, the major portion or the attaching portion 11 is spaced from the support 1, and on that side the support is engaged only by the flat ends of the spaced tongues 17.

When a strand or conductor is to be inserted in the receiving portion 12, it is forced under pressure through the throat 21 tending to separate the finger portion 20 from the loop 14. Application of pressure at this point may tilt the clip relatively to the support, as shown in Fig. 2, rocking the clip about the tongue 17 and heel 23 where the base 10 joins the loop 18. Even in this tilted position, the clip securely grips the support and strongly resists removal therefrom.

The invention provides an extremely simple and efficient clip, cheap to manufacture and which meets the most rigid requirements of stable and secure attachments to thin supporting members.

Although I have illustrated and described preferred embodiments of my invention, I do not wish to be limited thereby because the scope of my invention is best defined by the following claims.

I claim:

1. A clip for attachment to a plate-like support, said clip being formed from spring sheet material bent to a generally S-shape providing an intermediate base portion and opposed attaching and strand-receiving portions, each connected to said base by resilient loop portions, said attaching portion being formed with inturned flat end tongues of greater width than thickness for engaging and gripping the surface of said plate under tension of the loop portion connecting the attaching portion and base.

2. A clip for attachment to a plate-like support, said clip being formed of a single piece of material bent to a generally S-shape providing an intermediate base portion and opposed attaching and strand-receiving portions, each connected to said base by resilient loop portions, said attaching portion being formed with transversely spaced inturned tongues for engaging and gripping said plate under tension of the loop portion connecting the attaching portion and base, said tongue serving to hold the remaining parts of said attaching portion spaced from said support with only the spaced tongues engaging the support on one side thereof, said base engaging the opposite side of said support throughout a relatively large area intermediate said tongues, the said tongues having flat ends of greater width than thickness for the purpose described.

3. A clip for attachment to a plate-like support comprising a base portion, a substantially parallel attaching portion overlying said base, a loop portion resiliently connecting said base and attaching portion, said attaching portion being formed with a plurality of downwardly turned resilient tongues having flat ends of greater width than thickness for engaging and gripping the surface of said base at spaced restricted areas, said base engaging the opposite face of the support throughout a relatively larger area intermediate said restricted tongue-engaging area, and a strand-receiving portion resiliently connected to the base.

WALTER I. JONES.